United States Patent [19]
Hagen

[11] Patent Number: 5,985,947
[45] Date of Patent: Nov. 16, 1999

[54] EXTRUDED FOAMED SILICONE RUBBER COMPOSITION AND METHOD FOR MAKING SAME

[76] Inventor: Peter Hagen, 290 Cetas Rd., Harbor Springs, Mich. 49740

[21] Appl. No.: 09/220,240

[22] Filed: Dec. 23, 1998

[51] Int. Cl.⁶ ...................................................... C08J 9/08

[52] U.S. Cl. .............................. 521/97; 521/154; 521/913

[58] Field of Search ................................ 521/97, 154, 913

[56] References Cited

U.S. PATENT DOCUMENTS 4,097,423  6/1978  Dieterich ................................. 521/154
4,129,696  12/1978  Markusch et al. ...................... 521/154

*Primary Examiner*—Morton Foelak
*Attorney, Agent, or Firm*—Dinnin & Dunn, P.C.

[57] ABSTRACT

An extruded foamed silicone rubber composition including ammonium carbonate or ammonium bicarbonate reacted with acetic acid at room temperature. The components can be adjusted to control the degree of foaming, and the amount of acetic acid can be adjusted to control the cure rate.

14 Claims, No Drawings

EXTRUDED FOAMED SILICONE RUBBER COMPOSITION AND METHOD FOR MAKING SAME

BACKGROUND OF THE INVENTION

The present invention relates to a composition for foamed silicone rubber extrusions. Silicone rubber extrusions have long been used for a variety of applications, limited only by the imagination for the use of flexible plastic strips. Typical uses include baseboard molding strips or structural joining seals or strip sealants, but these are only illustrative of the range of available uses, particularly in light of the unlimited number of cross-sectional profiles which may be produced in the extrusion process by modifying the extrusion die. In the field of architecture, elastomeric architectural strips are used to cover joints between building sections, at roof lines and around windows, both in new construction and as a repair item for preexisting buildings. Silicone polymers are particularly important in the fabrication of architectural strips. These polymers are extremely flexible and strong, and their inertness makes them resistant to oxidation and photo degradation. Silicone rubbers may be fabricated in a variety of colors by the inclusion of pigments therein, so as to match a variety of substrates.

A wide variety of elastomeric articles can be prepared from silicones or other polymeric compositions by a process in which a resin composition is extruded to provide a shaped body which is subsequently cured to produce the finished item. In the context of the present disclosure, an extrusion process is defined to include any forming process wherein a precursor of the elastomer is forced under pressure into or through a shaping member such as a die or a mold to produce the shaped body. A number of shaping processes are known in the prior art. For example, U.S. Pat. No. 4,783,289 discloses a continuous extrusion process for the preparation of elongated silicone rubber members. According to the process, a hydrolyzable silicone composition is extruded from a die into a body of water to produce an elongated member, which passes through the body of water and cures while it is doing so.

The use of silicone based sealant fillers is similarly well known in the construction industry. These types of products are commercially available from Dow Corning Corp., Midland, Mich.: DC®732 Multi Purpose Sealant; DC®790 Building Sealant; DC®795 Building Sealant and from General Electric Company, Waterford, N.Y.; GE®1200; GE®SilProof. These products are used to fill in or seal or conceal joints in construction, such as expansion joints in structural wall or floor members. These sealants or caulks may be liquid (uncured) in storage but and if hydrolyzable, will rapidly begin to cure when exposed to typical atmospheric humidity. These sealants are typically stored in tubes and are dispensed through a nozzle at one end of the tube by forcing the enclosing wall at the opposite end of the tube toward the nozzle. This form of application is well known in the industry, and utilizes an applicator commonly referred to as a caulk gun. When the sealant flows from the nozzle of the storage tube it typically forms a bead of a diameter dependent upon the diameter and cross section of the nozzle and upon the rate of application.

An advantage of extruded silicone products is the relatively low cost of materials and processing, which in turn has created a great deal of competition and relatively low profit margins. Thus, there is a need in the art for extrudable silicone compositions which are more efficiently made at a lower cost. Many extrusion compositions require elevated temperatures to melt to an extrudable and mixable state and an elaborate or expensive curing process. To reduce costs, it is an advantage to be able to perform all steps of the extrusion process at or about room temperature. It has long been recognized that a blowing agent may be added to rubber compositions to create a foamed structure which is less dense. Such foamed compositions utilize less rubber per volume and thus, in certain applications, may have a lower material cost. However, many of the existing processes for creating an extrudable silicone rubber compound require special equipment for introducing the blowing agent, or require additional heating or mixing, or require special curing, or require expensive blowing agents or other components to produce a stable, flexible extrusion which may be readily processed and which has a reasonable shelf life and product life. In particular, most systems require temperatures greater than room temperature (approximately 20° C.) for the reaction to activate the blowing agent, typically in excess of 25° C. While such temperatures may not require much energy to generate within the mixing vessel, the equipment required to heat the mixing vessel can be costly. Thus, there is a need in the art for an inexpensive way to produce blown extrudable rubber composition. It is also a major concern in the use of blowing agents that the by-products or exhaust be inert so as to avoid potential health or environmental issues.

All extrusion compounds must be sufficiently viscous to be forced through the extrusion die, but then must cure into a sufficiently solid form for handling. The cure rate can greatly effect the physical properties of the resultant compound. Temperature is one variable that is typically controlled to govern the rate of cure, often through mechanisms as fans, heaters or water baths. With hydrolyzable compounds, the cure rate is effected by humidity and one method of speeding the curing process is to utilize a water bath. Unfortunately, the physical parameters such as temperature and humidity can vary widely, even within a single extrusion facility. Many extrusion lines exceed 200 feet in length, and it can be an expensive proposition to maintain the building containing the extrusion line at a constant temperature and humidity. Thus, the use of fans, heaters and/or water baths becomes a matter of constant adjustment and fine tuning. Variation in the rubber composition components can also affect the curing characteristics, but such variations also directly effect the chemical composition of the product. There is perceived to be a need in the art for a relatively low cost way to vary the cure rate for a silicone extrusion other than adjustment of the physical conditions during cure.

These and other advantages of the present invention will be readily apparent from the drawings, discussions and description which follow.

SUMMARY OF THE INVENTION

The present invention provides a novel composition for an extrudable silicone rubber which utilizes relatively low cost components, requires lower cost processing, and which requires relatively less materials. Annoniumcarbonate or ammoniumhydrogencarbonate are included in the crosslinker components in a typical extrudable three component silicone rubber compound. Acetic acid is included with the catalyst component. The annoniumcarbonate or ammoniumhydrogencarbonate will react with the acetic acid at room temperature yielding carbon dioxide which acts as a blowing agent, creating a foamed extrudable silicone rubber compound.

Further, the amount of the acetic acid can be varied to increase the acidity of the environment which reduces the cure speed. The amount of annoniumcarbonate or ammoniumhydrogencarbonate controls the amount of acetic acid that will react, so adjusting the excess acetic acid level will act to directly control the cure rate of the compositions.

DETAILED DESCRIPTION OF THE PREFERRED EMBODIMENT

The present invention is an improvement to the existing formulations for and methods of making extruded silicone rubber products. Silicone extrusions are typically formulated from two or three part combinations comprising:

A. Silicone Base;
B. Catalyst;
C. Crosslinker

The base typically include a silicone polymer, silica and inactive fillers such as calcium carbonate. A typical formula for a silicone rubber extrusion is:

93% Silicone Base (60% silicone polymer, 35% calcium carbonate and 5% silica)
1% Catalyst
4% Additives (Crosslinker and pigment/solvent solution)

The components are mixed together by standard means that provide a homogeneous mixture. The preferred mixing apparatus is an in-line dynamic mixer wherein the components are fed at a constant rate in a non-pulsating manner into one end of the mixer and the mixture is extruded at a constant rate through a shaping die located at the opposite end of the mixer. For extruding, the composition is maintained at a temperature greater than 5° C., preferably in a range of about 10° C. to 25° C. For sealants the composition may be extruded directly into the product container, such as the familiar caulk containers.

The mixed composition can be extruded through a shaping die which is held by a die holder attached to the outlet of the container which holds the mixed composition. Preferably the composition is extruded through a shaping die held by a die holder attached to the mixing apparatus. The shaping die is a simple plate die of metal or plastic. A complicated or rugged die is not required because the composition is of a liquid or paste viscosity so the pressures necessary for extrusion are relatively low, obviating the need for high strength constructions. The pressures typically employed are in the range of about 100–500 psi.

The silicone base is well known in the art, and preferably comprises a polydiorganosiloxane having at least two silicone-bonded hydrolyzable groups per molecule, which is commercially available.

The preferred silicone crosslinker has at least three silicone-bonded hydrolyzable groups per molecule and preferably four. The hydrolyzable silicone crosslinker may be a polyalkoxy-silane crosslinker. Hydrolyzable silicone compound crosslinkers useful in such compounds are commercially available.

The filler can be a reinforcing filler or an extending filler or a combination of both. The filler can be treated or untreated. Examples for reinforcing fillers include fumed or precipitated silica, silica aerogel, and silica xerogel. A preferred silica treating agent is hexamethylendisilazane. Examples of extending fillers include titanium dioxide, diatomaceous earth, iron oxide, aluminum oxide, zinc oxide, quartz, calcium, carbonate, magnesium oxide, carbon black, graphite, glass fibers, glass micro spheres, glass micro balloons, glass beads, carbon fibers, silicon carbide, polystyrene beads, metal fibers and the like. A preferred treating agent for calcium carbonate is stearic acid. Fillers and treating agents useful in such compounds are commercially available.

The silicone composition optionally comprises a curing catalyst to accelerate the condensation-type crosslinking reaction. Examples of curing catalysts include tin catalysts, e.g. dibutyltindiacetate, dibutyltindilaurate, stannous octoate, and stannous 2-ethylhexanoate, and other similar compounds. Examples of the curing catalyst also include other metal salts of carboxylic acid, e.g. metal carboxylates in which the metal atoms may include iron, cobalt, manganese, and zinc; organon titanate and chelated titanates, e.g. tetrabutyl titanate, tetra(isopropyl) titanate, tetra (2-ethylhexyl) titanate, and diisopropoxy-bis (acetoacetonate) titanium; and the like. Curing catalysts useful in such compounds are commercially available.

The preferred silicone compositions are preferably in a multi component package delivery form wherein one package may comprise the polydiorganosiloxane and filler(s); a second package comprises the polyalkoxy-silicone crosslinker and a third package the catalyst. Multi component delivery helps to prevent premature curing of the composition.

Other additives commonly used in silicone sealant can be used in the hydrolyzable siloxane compositions of the present process, such as colorants, e.g. pigments or dyes; fungicides; solvents; adhesion promoters; anti-oxidants; cure regulators; plasticizers such as silicone fluids, e.g. trimethylsiloxy-end blocked dimethylpolysiloxane having a viscosity in the range of about 0.1 to 1 Pa.s at 25° C.; and pacifiers, e.g. low molecular weight silanol polyorganosiloxanes; and the like. Such additives are commercially available.

Blowing Agent

An additional ingredient to the compound according to the present invention is an ammonia salt such as ammoniumcarbonate $(NH_4)_2Co_3$, which decomposes at 58° C. into carbon dioxide $(CO_2)$, water $(H_2O)$, and ammonia $(NH_3)$, or ammonium-bicarbonate $(NH_4HCO3)$ which decomposes at 60° C. into the same components. The salt may be added to the part B component of the mixture. These ammonia salts have been used as leavening agents in baking and in making foamed rubber products and artificial sponges.

An additional ingredient is added to the compound to react at room temperature with the ammonia salt to yield the carbon dioxide which foams the rubber compound. It should be noted that each of the ingredients is stable and nonreactive until combined with other ingredients. In the two examples, acetic acid $(CH_3COONH)$ is added, yielding the following reactions:

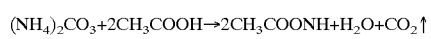

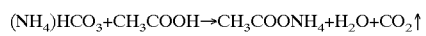

The other products of the reactions, ammonia-acetate $(CH_3COONH_4)$ and water $(H_2O)$ are not chemically reactive, but the water in the mixtures facilitates the complete reaction between the silicone polymer and the crosslinker.

The resultant silicone rubber compound has a much lower density, in the below example the density was reduced from 1.25 [measure grams/mm$^3$] to less than 1.0. Thus, the material savings exceeds 20%. Further, the foamed material exhibited lower modules properties and a slightly textured surface.

Example:
Part A: 93% silicone polymer Base (60% silicone polymer, 35% calcium-carbonate and 5% silica)
Part B: 4% crosslinker-slurry (50% three or tetra functional polyalkoxy-silane, 7% ammonium-carbonate or ammonium-bicarbonate, pigments and/or inert liquid extenders)
Part C: 1% catalyst (40% tin-organo catalyst, 40% acetic-acid; 20% inert liquid extenders).

The amount of carbon dioxide blowing agent is controlled by the amount of ammonium-carbonate or ammonium-bicarbonate included in Part B and the amount of acetic acid included in Part C. As shown in the example, the preferred percentage by weight of acetic acid is about 0.40% and of the ammonium carbonate or ammonium bicarbonate is about 0.28%. The degree of foaming is dependent upon the presence of both reactants, so the lower level of either reactant can be adjusted to control the degree of foaming. While the preferred formulation produces a preferred degree of foaming with respect to structural integrity and density, it will be appreciated that less of the reactive components can be added, creating a more dense and just slightly foamed product, or more could be added to create a highly foamed less structurally sound product.

Cure Rate Adjustment

It has been discovered that silicone rubber based extrusions will cure more slowly in a more acidic environment. By increasing the amount of acetic acid added to the compound, the cure speed of the compound can be slowed. Thus, the ammonium carbonate or bicarbonate component can be adjusted to control the degree of foaming, while the acetic acid can be adjusted to control the cure rate. Typically, doubling the acetic acid will achieve a desired slowing of the cure rate, but it is believed that an even more acidic environment would slow the cure rate even more.

In view of the foregoing, it is to be understood that the discussion and description herein are merely meant to represent a particular embodiment of the invention and are not meant to be a limitation upon the practice thereof. It is the following claims, including all equivalents, which define the scope of the invention.

Thus, the method according to the present invention includes metering the quantity of acetic acid in excess of the amount required to generate the desired level of blowing agent to adjust the acid level of the environment and thus adjust the cure rate of the compound.

What is claimed is:

1. A foamable silicone composition comprising by weight:
   85 to 98% of a silicone base including a silicone polymer;
   2 to 12% of a crosslinker component including a foaming agent selected from the group consisting of ammonium carbonate and ammonium bicarbonate
   0.25 to 4% of a catalyst component including acetic acid.
2. The foamable silicone composition of claim 1 wherein said silicone base comprises by weight:
   50 to 90% silicone polymer;
   20 to 40% calcium carbonate; and
   0 to 10% silica.
3. The foamable silicone composition of claim 1 wherein said crosslinker component further includes polyalkoxy silane.
4. The foamable silicone composition of claim 1 wherein the total weight of said composition includes at least 0.2% of said foaming agent and between 0.1% and 1.5% of acetic acid.
5. The foamable silicone composition of claim 1 wherein the total weight of said composition includes at least 0.3% acetic acid and between 0.1% and 1.0% of said foaming agent.
6. The foamable silicone composition of claim 1 wherein the total weight of said composition includes between 0.1% to 0.9% acetic acid and between 0.03% to 0.73% of said foaming agent.
7. The foamable silicone composition of claim 1 wherein the total weight of said composition includes between 0.14% to 0.56% of said foaming agent and between 0.20% to 0.80% acetic acid.
8. A method of producing a foamed silicone composition comprising the steps of providing:
   85 to 98% by weight of a silicone base including a silicone polymer;
   2 to 12% by weight of a crosslinker component including a foaming agent which comprises a compound selected from the group consisting of ammonium carbonate and ammonium bicarbonate;
   0.25 to 4% by weight of a catalyst including acetic acid; and mixing the components at ambient temperature.
9. The method of claim 8 further comprising the step of extruding said composition.
10. The method of claim 8 further comprising the step of selecting the proportion of acetic acid within the range of about 0.05% to about 1.2% of the total weight of the composition to determine the degree of foaming in said composition.
11. The method of claim 8 further comprising the step of selecting the proportion of acetic acid within the range of about 0.20% to about 0.84% of the total weight of the composition to determine the degree of foaming in said composition.
12. The method of claim 8 further comprising the step of selecting the proportion of said foaming agent within the range of about 0.03% to about 0.73% of the total weight of the composition to determine the degree of foaming in said composition.
13. The method of claim 8 further comprising the step of selecting the proportion of said foaming agent within the range of about 0.14% to about 0.56% of the total weight of the composition to determine the degree of foaming in said composition.
14. The method of claim 8 further comprising the step of selecting the proportion of said acetic acid within the range of about 0.20% to about 2.4% of the total weight of the composition to determine the cure rate of said composition.

* * * * *